United States Patent
Lalancette

(10) Patent No.: US 8,936,409 B2
(45) Date of Patent: Jan. 20, 2015

(54) LOCKING DEVICE FOR A ROOFTOP SUPPORT

(76) Inventor: Daniel Lalancette, St-Jean-sur-Richelieu (CA)

(*) Notice: Subject to any disclaimer, the term of this patent is extended or adjusted under 35 U.S.C. 154(b) by 0 days.

(21) Appl. No.: 13/091,831

(22) Filed: Apr. 21, 2011

(65) Prior Publication Data

US 2011/0262216 A1 Oct. 27, 2011

Related U.S. Application Data

(60) Provisional application No. 61/326,476, filed on Apr. 21, 2010.

(51) Int. Cl.
*F16B 39/32* (2006.01)
*E04D 11/00* (2006.01)
*E04F 15/024* (2006.01)

(52) U.S. Cl.
CPC .......... *E04D 11/007* (2013.01); *E04F 15/0247* (2013.01)
USPC .......................................... 403/320; 411/329

(58) Field of Classification Search
CPC ... F16B 39/32; Y10S 411/951; E04F 15/0247
USPC ........... 403/320, 330, 343; 411/329; 52/126.6
See application file for complete search history.

(56) References Cited

U.S. PATENT DOCUMENTS

| | | | | |
|---|---|---|---|---|
| 185,008 A * | 12/1876 | Young | | 411/329 |
| 284,013 A * | 8/1883 | Holmes | | 411/329 |
| 611,479 A * | 9/1898 | Harling | | 411/329 |
| 879,714 A * | 2/1908 | Abe et al. | | 411/329 |
| 962,582 A * | 6/1910 | Payne | | 411/198 |
| 1,047,870 A * | 12/1912 | Young | | 411/329 |
| 1,221,194 A * | 4/1917 | Lang | | 411/329 |
| 1,640,374 A * | 8/1927 | Russell | | 411/296 |
| 1,703,947 A * | 3/1929 | Nation | | 411/329 |
| 2,044,667 A * | 6/1936 | Collins | | 411/328 |
| 3,279,134 A * | 10/1966 | Donovan | | 52/126.6 |
| 3,295,272 A * | 1/1967 | Kanno | | 52/126.6 |
| 5,590,494 A * | 1/1997 | Miller | | 52/169.9 |
| 5,951,224 A * | 9/1999 | DiStasio | | 411/329 |
| 6,402,798 B1 * | 6/2002 | Kallsen et al. | | 55/385.3 |
| 6,442,906 B1 * | 9/2002 | Hwang | | 52/126.6 |
| 6,536,717 B2 | 3/2003 | Parker | | |
| 6,682,281 B1 * | 1/2004 | Larsen | | 411/327 |
| 6,983,570 B2 * | 1/2006 | Mead | | 52/263 |
| 7,921,612 B2 * | 4/2011 | Knight et al. | | 52/126.6 |
| 8,122,612 B2 * | 2/2012 | Knight et al. | | 33/836 |
| 8,186,902 B2 * | 5/2012 | Lee et al. | | 403/315 |
| 2004/0047709 A1 * | 3/2004 | DiStasio et al. | | 411/329 |
| 2011/0192941 A1 * | 8/2011 | Lalancette et al. | | 248/70 |

* cited by examiner

*Primary Examiner* — Joshua Kennedy
(74) *Attorney, Agent, or Firm* — Butler Snow LLP

(57) ABSTRACT

A locking device that prevents a rooftop support device from being separated into upper and lower parts is disclosed. The locking device stops the lower base from being fully unscrewed from the upper platform. The device automatically releases to allow the lower base to be screwed back onto the upper platform.

14 Claims, 5 Drawing Sheets

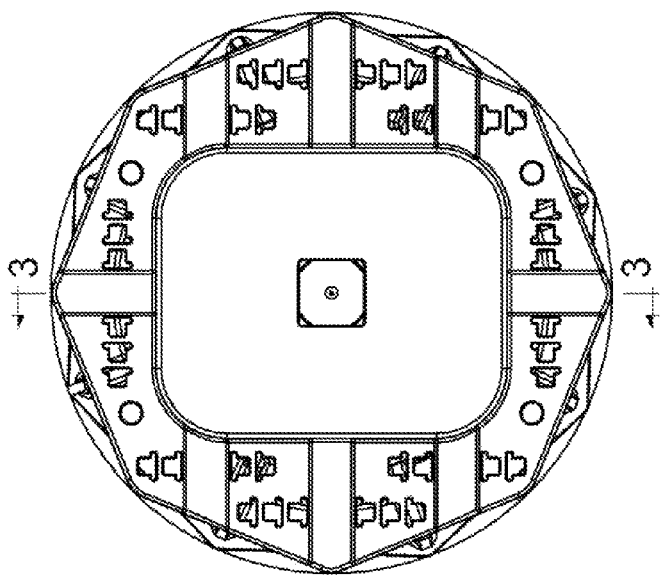
FIG. 2
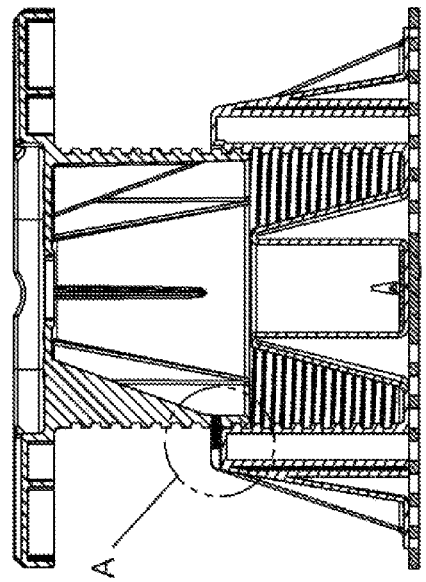
FIG. 3
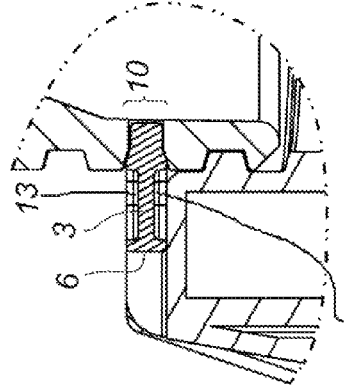

DETAIL B

LOCKING DEVICE FOR A ROOFTOP SUPPORT

FIELD OF THE INVENTION

The present invention is generally directed toward a device for preventing the upper platform of a rooftop support from disengaging from its base.

BACKGROUND OF THE INVENTION

A rooftop support, such as that disclosed in U.S. Patent Publication 2011/0192941, can be constructed of two parts, an upper platform and a lower base, which are threadably connected.

The height of the rooftop support is increased by rotating the lower base about its central axis. However, if the base is rotated beyond the point at which it is securely attached to the upper platform, the upper platform and load which it supports can become unstable. A heavy load could potentially topple and injure the operator of the rooftop support.

SUMMARY OF THE INVENTION

A locking device for a rooftop support is disclosed. The locking device prevents the upper platform of the rooftop support from separating from the lower platform.

The locking device automatically engages when the rooftop support reaches the desired maximum height. The locking device automatically disengages by simply turning the lower base back to decrease the height of the rooftop support. The locking device can also easily be disengaged to allow the upper platform to completely separate from the lower platform, if required.

BRIEF DESCRIPTION OF THE DRAWINGS

Further advantages of the invention will become apparent by reference to the detailed description of preferred embodiments when considered in conjunction with the drawings:

FIG. 2 depicts a top plan view of the rooftop support.

FIG. 3 depicts a cross section view of the rooftop support as viewed along line 3-3 of FIG. 2 and also showing a detail view of inset DETAIL A.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
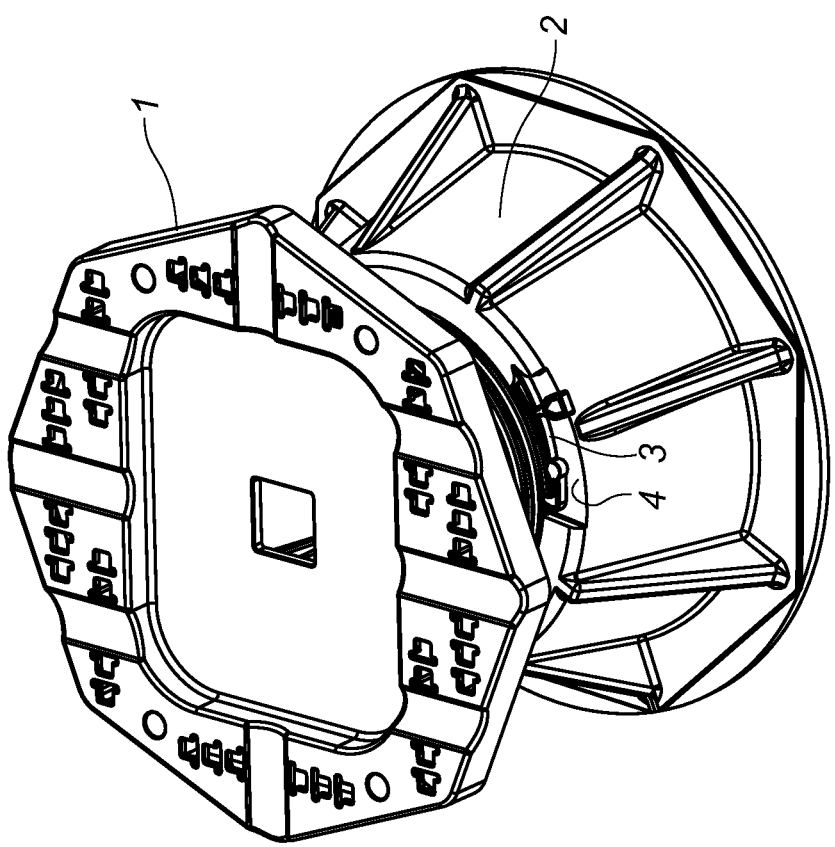
FIG. 1 depicts a perspective view of the rooftop support, including the locking device.

Referring to the drawings, FIG. 1 illustrates a rooftop support which includes the locking device 3. The locking device 3 is mounted in a recessed section 4 of the upper rim of the lower base 2.

Figure 4:
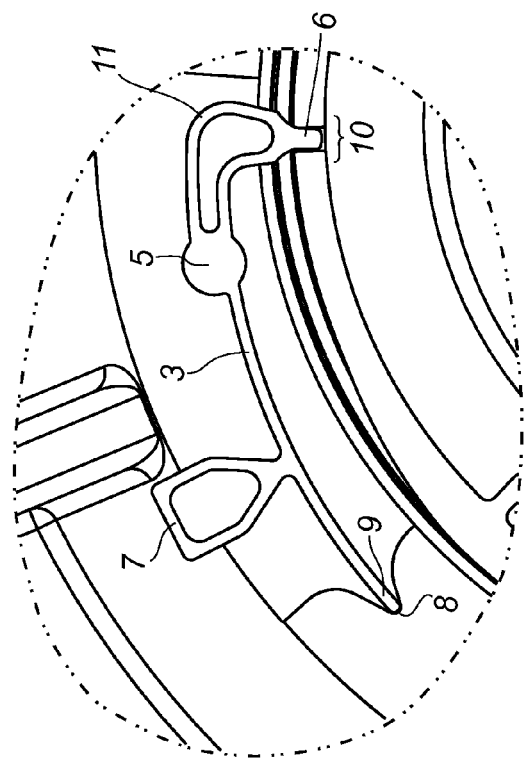
FIG. 4 depicts a top plan view of the lower base of the rooftop support including a detail view of inset DETAIL B.
Figure 4:
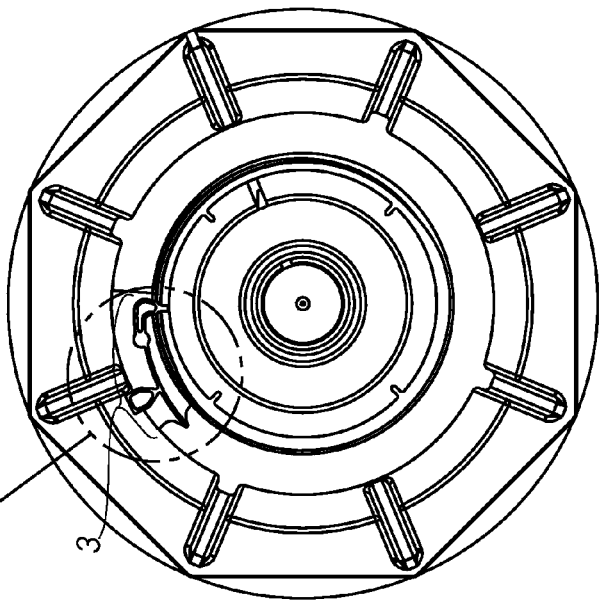

As depicted in FIG. 4, locking device 3 is constructed of a single piece of a resilient material, such as plastic or metal. One end of locking device 3 has a lock body 11, including a lock pin 6 which is configured to engage with slot 10 located in upper platform 1. The opposite end 9 of locking device 3 rests in a groove 8, which exists in one wall of recessed section 4.

Locking device 3 is mounted in recessed section 4 such that lock body 11 can pivot about pivot point 5. This mounting can be accomplished in several ways, including through the use of a bolt 13 that runs through pivot point 5, or an extension of the locking device 3 that forms an axle 12 that is secured through a hole in lower base 2, as can be seen in DETAIL A of FIG. 3. The pivot point 5 allows lock pin 6 to move both toward and away from the slot 10.

Because the locking device 3 is made of a resilient material, it has both a relaxed state and a state of higher spring tension when its shape is deformed. Locking device 3 has a generally curved shape in its relaxed form, with the lock pin 6 engaged in slot 10, as in FIG. 5. When the locking device 3 is not engaged, the locking device 3 is in a state of higher spring tension and takes a generally linear form. The built-up spring tension causes lock pin 6 to push against the threads of upper platform 1.

Figure 5:
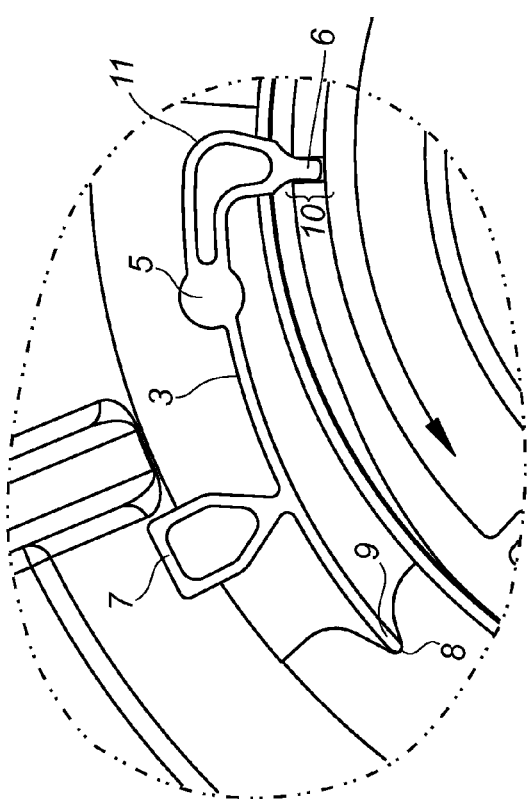
FIG. 5 depicts a detail view of the locking device as the lower base is unscrewed from the upper platform.

When lower base 2 has not been unscrewed sufficiently from upper platform 1 to engage the locking device 3, lock pin 6 is pressed against the grooves of the threads in upper platform 1. As lower base 2 is unscrewed from upper platform 1, lock pin 6 approaches the slot 10 which is located between the lower threads of upper platform 1. As the lock pin 6 begins to pass over the slot 10, the spring tension causes the lock pin 6 to enter the slot 10, locking lower base 2 in place. Attempts to further unscrew lower base 2 beyond this point causes the lock body 11 and lock pin 6 to dig further into slot 10, as illustrated in FIG. 5, preventing lower base 2 from being unscrewed.

Figure 6:
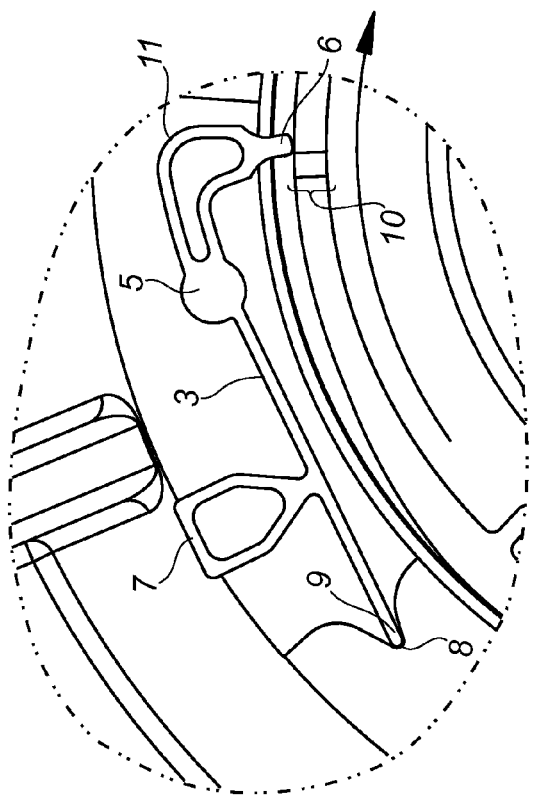
FIG. 6 depicts a detail view of the locking device as the lower base is screwed in toward the upper platform.

It should be appreciated from FIG. 6, that the shape of lock body 11 causes the locking device 3 to automatically disengage from slot 10 if the operator attempts to screw lower base 2 back to upper platform 1 in order to decrease the height of the rooftop support. The curved surface where lock pin 6 and lock body 11 meet, combined with the flexibility of the lock body 11 to pivot about the pivot point 5, facilitates this release.

This ability to disengage the lock by screwing lower base 2 back into upper platform 1 is particularly beneficial to the operator who is likely holding the object to be supported in one hand, and the rooftop support in the other hand. With both hands full, the operator would experience significant difficulties if lower base 2 completely unscrewed from the upper platform 1. The material being supported could potentially topple on top of the operator. The lock prevents the operator from unscrewing lower base 2 too far. Because disengaging the lock is a simple matter of screwing lower base 2 back toward upper platform 1, the operator does not need two hands to disengage the lock.

Figure 7:
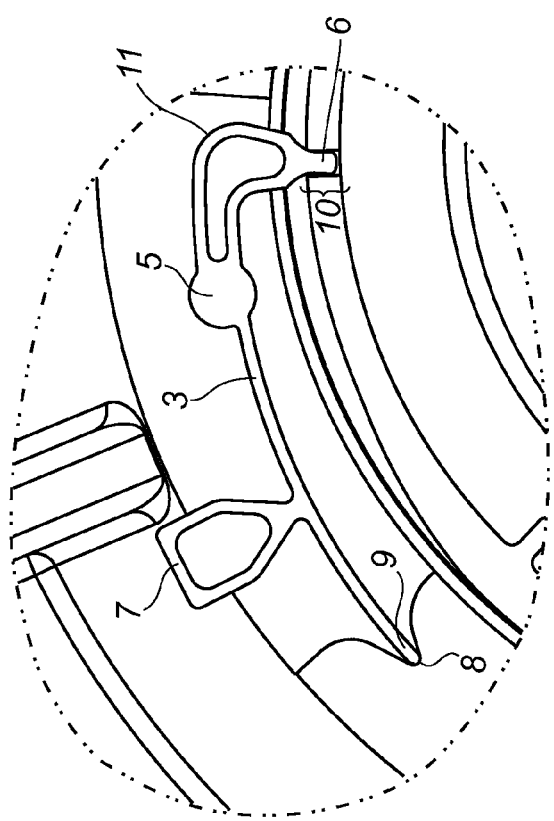
FIG. 7 depicts a detail view of the locking device in a locked state.

Locking device 3 may also optionally include release button 7 located between pivot point 5 and groove 8 as shown in FIG. 7. Release button 7 allows the operator to disengage the lock to completely separate lower base 2 from upper platform 1. This feature is useful in situations where either lower base 2 or upper platform 1 need to be interchanged with another having different features or sizes.

Figure 8:
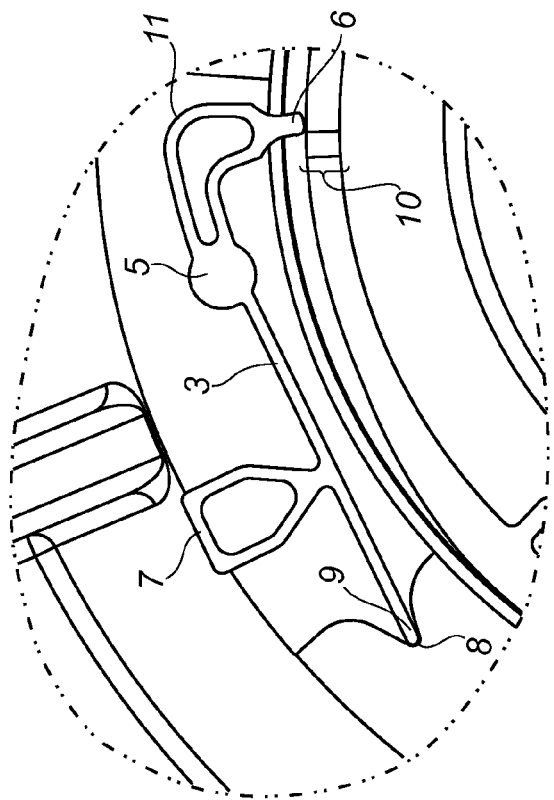
FIG. 8 depicts a detail view of the locking device in an unlocked state with the release button depressed.

As can be seen from FIG. 8, pressing release button 7 causes the locking device 3 to pivot about pivot point 5 such that lock body 11 and lock pin 6 move away from slot 10 in upper platform 1, disengaging the lock. Preferably, release button 7 is shaped such that it extends far enough beyond the lip of lower base 2 to be easily pressed. However, release button 7 may just be a marked location on locking device 3 that indicates where to press to disengage lock pin 6 from slot 10 in upper platform 1.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques, other than those specifically described herein, can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A rooftop support locking device for preventing a lower base of a rooftop support from being separated from an upper platform comprising:
a resilient material mounted to said lower base, said resilient material having a lock body disposed at a first end, an opposite end disposed at a second end of said resilient material, a pivot point disposed on said resilient material between said first end and said second end of said resilient material,
said lock body engages with a lock slot located in said upper platform,
and said resilient material also having a marked release button disposed on said resilient material between said pivot point and said opposite end for disengaging the lock body from the lock slot,
and said pivot point having an axle for mounting said resilient material to said lower base,
wherein said resilient material has a generally linear shape from said pivot point to said opposite end when not engaged with said lock slot and a generally curved shape from said pivot point to said opposite end when engaged with said lock slot.

2. The device of claim 1 wherein such locking device automatically disengages the lock body from said lock slot when said lower base screws back into said upper base.

3. The device of claim 1 wherein said locking device is made of plastic.

4. The device of claim 1 wherein said locking device is mounted into a recessed section of said lower base of said rooftop support such that said locking device can pivot about said pivot point.

5. The device of claim 1 wherein said axle comprises a part of said locking device at said pivot point that extends into the lower base.

6. The device of claim 1, wherein said marked release button for disengaging the lock body from the lock slot is shaped to be easily pressed.

7. The device of claim 1, wherein said axle comprises a bolt that runs through said pivot point.

8. A rooftop support locking device for preventing a lower base of a rooftop support from being separated from an upper platform comprising a resilient material located on said lower base having a lock pin at a first end, an opposite end disposed at a second end, and a pivot point disposed between said first end and said second end, said lock pin configured to engage with a lock slot in said upper platform of said rooftop support, and said resilient material also having a marked release button disposed on said resilient material between said pivot point and said opposite end for disengaging the lock pin from the lock slot and also having an axle at said pivot point for mounting said resilient material to said lower base, wherein said resilient material has a generally linear shape from said pivot point to said opposite end when not engaged with said lock slot and a generally curved shape from said pivot point to said opposite end when engaged with said lock slot.

9. The device of claim 8 wherein such locking device automatically disengages the lock pin from said lock slot when said lower base is rotated toward said upper platform.

10. The device of claim 8 wherein said locking device is made of plastic.

11. The device of claim 8 wherein said locking device is mounted into a recessed section of said lower base of said rooftop support such that said locking device pivots about said pivot point.

12. The device of claim 8 wherein said axle comprises a part of said locking device at said pivot point that extends into the lower base.

13. The device of claim 8, wherein said marked release button for disengaging the lock pin from the lock slot is shaped to be easily pressed.

14. The device of claim 8, wherein said axle comprises a bolt that runs through said pivot point.

\* \* \* \* \*